United States Patent Office 3,635,860
Patented Jan. 18, 1972

3,635,860
EPOXY SOLDERS

George A. Salensky, Metuchen, N.J., assignor to Union Carbide Corporation, New York, N.Y.
No Drawing. Filed Dec. 22, 1969, Ser. No. 887,316
The portion of the term of the patent subsequent to June 10, 1986, has been disclaimed
Int. Cl. C08g 45/04, 51/04
U.S. Cl. 260—23.7          17 Claims

ABSTRACT OF THE DISCLOSURE

This invention relates to epoxy solders, based on cycloaliphatic dieopoxides and dimers of unsaturated fatty acids in admixture with polymers of butadiene, which are suitable for use as automotive body solders on electro coated or primed surfaces.

---

This invention relates to curable compositions, based on cycloaliphatic diepoxides and dimers of unsaturated fatty acids in admixture with polymers of butadiene and to cured products obtained therefrom. More particularly, the present invention relates to curable compositions, as described above, which are suitable for use as automotive body solders on electro coated or primed surfaces.

Currently, automobile manufacturers are electro coating or priming metal surfaces of automobile parts in order that the ultimate top coat have better adhesion, through the primer, to the metal surfaces. Electro coating or priming of metal surfaces, although effecting better adhesion of the top coat to the metal surfaces, has presented a problem with respect to the successful utilization of epoxy solders to cover defects of the metal surfaces. It has been found that epoxy solders, applied to metal surfaces which have been electro primed, tend to lose adhesion when subjected to an external impact.

The present invention provides curable compositions which have excellent adhesion to electro coated or primed metal surfaces and which maintain this excellent adhesion even after being subjected to a severe external impact.

The curable compositions comprise a mixture of
(a) Diepoxides of cycloaliphatic esters of dicarboxylic acids having the formula:

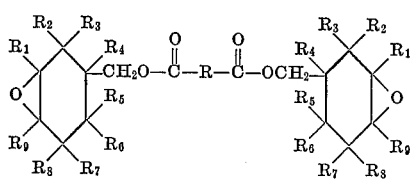

wherein $R_1$ through $R_9$, which can be the same or different are hydrogen or alkyl radicals generally containing 1 to 9 carbon atoms inclusive and preferably containing 1 to 3 carbon atoms inclusive as for example, methyl, ethyl, n-propyl, n-butyl, n-hexyl, 2-ethylhexyl, n-octyl, n-nonyl and the like; R is a divalent hydrocarbon radical generally containing 3 to 9 carbon atoms inclusive and preferably containing 4 to 6 carbon atoms inclusive, as for example, alkylene radicals, such as trimethylene, tetramethylene, pentamethylene, hexamethylene, 2-ethylhexamethylene, octamethylene, nonamethylene, and the like; cycloaliphatic radicals, such as 1,4-cyclohexane, 1,3-cyclohexane, 1,2-cyclohexane, and the like.

Among specific diepoxides of cycloaliphatic esters of dicarboxylic acids are the following:

Bis(3,4-epoxycyclohexylmethyl)glutarate,
Bis(3,4-epoxycyclohexylmethyl)adipate,
Bis(3,4-epoxy-6-methylcyclohexylmethyl)adipate,
Bis(3,4-epoxycyclohexylmethyl)pimelate, and the like.

Other suitable compounds are described in U.S. Pat. 2,750,395 to B. Phillips et al.

(b) A 3,4-epoxycyclohexylmethyl 3,4-epoxycyclohexane carboxylate having the formula:

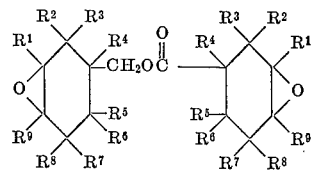

wherein $R^1$ through $R^9$, which can be the same or different, are as defined for $R_1$ in (a).

Among specific compounds falling within the scope of the above formula are the following:

3,4-epoxycyclohexylmethyl 3,4-epoxycyclohexane-carboxylate,
3,4-epoxy-1-methylcyclohexylmethyl 3,4-epoxy-1-methylcyclohexanecarboxylate,
6-methyl-3,4-epoxycyclohexylmethyl 6-methyl-3,4-epoxycyclohexanecarboxylate,
3,4-epoxy-3-methylcyclohexylmethyl 3,4-epoxy-3-methylcyclohexanecarboxylate,
3,4-epoxy-5-methylcyclohexylmethyl 3,4-epoxy-5-methylcyclohexanecarboxylate.

Other suitable compounds are described in U.S. Pat. 2,890,194 to B. Phillips et al.

(c) A dimer of an unsaturated monobasic fatty acid as for example dimers of acids having the formula:

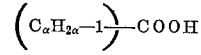

wherein $\alpha$ is an integer having a value of 6 to 20 inclusive such as $\Delta^{9,10}$-decylenic acid, $\Delta^{9,10}$-dodecylenic acid, palmitoleic acid, oleic acid, petroselinic acid, vaccenic acid and the like and dimers of unsaturated acids having the formula:

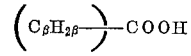

wherein $\beta$ is an integer having a value of 6 to 20 inclusive such as linoleic acid and the like. Other suitable dimers are enumerated in U.S. Pat. 2,994,660.

(d) Anhydrides of polybasic acids as for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, nonenylsuccinic anhydride, octenylsuccinic anhydride, pentenylsuccinic anhydride, propylsuccinic anhydride, 1,2,4,5-benzenetetracarboxylic dianhydride, citraconic anhydride, 4-nitrophthalic anhydride, 1,2-naphthalic anhydride, 2,3-naphthalic anhydride, 1,8-naphthalic anhydride, tetrabromophthalic anhydride, and tetraiodophthalic anhydride. Also suitable are cyclopentanetetracarboxylic dianhydride, benzophenonetetracarboxydianhydride, and trimellitic anhydride. Polymeric anhydrides or mixed polymeric anhydrides of sebacic, maleic, adipic, pimelic, terephthalic and isophthalic acids are also suitable. Other suitable anhydrides are enumerated in U.S. Pat. 3,117,099 to Proops et al.

(e) Alkaline earth silicates such as calcium silicate and magnesium silicate, preferably magnesium silicate.

(f) Stannous acylates having the formula:

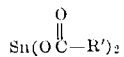

wherein R' is a monovalent hydrocarbon radical generally containing 2 to 12 carbon atoms inclusive and preferably containing 3 to 10 carbon atoms inclusive. Specific acylates falling within the scope of the formula above, wherein R' can be a saturated, unsaturated, branched or straight chain hydrocarbon radical, are: stannous propionate, stannous tartrate, stannous butyrate, stannous valerate, stannous caproate, stannous caprylate, stannous octoate, stannous laurate, stannous palmitate, stannous stearate, stannous oleate and the like.

(g) Cation exchanged bentonite. The cation exchanged bentonities are known compounds and are exemplified by those disclosed in U.S. Pat. 2,531,427 which are onium cation exchanged bentonite. Other suitable bentonites are those disclosed in U.S. Pat. 3,102,823 to J. P. Manasia et al. which are quaternary ammonium cation exchanged bentonite. Among suitable cation exchanged bentonites are dimethyldidodecylammonium bentonite, dimethyldihexadecylammonium bentonite, dimethylhexadecyloctadecylammonium bentonite, dimethyloctadecylbenzylammonium bentonite, dimethyldioctadecylammonium bentonite and the like. Also suitable are the commercially available cation exchanged bentonities supplied by National Lead Co. under the designation "Bentone." Particularly desirable bentonites have a moisture content of 0.5 to about 3 percent by weight.

(h) Polymers of butadiene—which are carboxyl containing homopolymers of butadiene and carboxyl containing copolymers of butadiene and acrylonitrile wherein: the homopolymers and copolymers have a molecular weight of about 500 to about 15,000, preferably about 1,000 to about 15,000 and have an average of more than one terminal carboxyl group per molecule. As a general rule, the copolymers contain about 1 to about 99 percent by weight and preferably about 5 to about 50 percent by weight combined acrylonitrile.

Carboxyl terminated polymers of butadiene, as defined, are further described in U.S. Pat. 3,135,716 to Carl A. Uraneck, U.S. Pat. 3,177,190 to Henry L. Hsieh, and in U.S. Pat. 3,285,949 to A. R. Siebert.

The amount of materials used to formulate the compositions of this invention are as follows:

(a) Diepoxides of cycloaliphatic esters of dicarboxylic acids—about ⅓ to about 3 equivalents and preferably about ½ to about 2 equivalents (based on the epoxy) groups) per equivalent of:

(b) A 3,4-epoxycyclohexylmethyl 3,4-epoxycyclohexanecarboxylate (based on the epoxy groups).

(c) Dimer of an unsaturated monobasic fatty acid—about 0.3 to about 0.6 and preferably about 0.4 to about 0.5 equivalent (based on the carboxy groups) per total epoxy equivalent [(a+b)].

(d) Anhydrides of polybasic acids—about 0.005 to about 0.2 and preferably about 0.02 to about 0.09 equivalent (based on the anhydride groups) per 100 parts by weight of dimer of an unsaturated monobasic fatty acid (c).

(e) Alkaline earth silicate—about 60 to about 140 and preferably about 80 to about 120 parts by weight per 100 parts by weight diepoxide [(a+b)] plus about 40 to about 110 and preferably about 58 to about 90 parts by weight per 100 parts by weight of dimer of an unsaturated monobasic fatty acid (c).

(f) Stannous acylate—about 3 to about 10 and preferably about 4 to about 8 parts by weight per 100 parts by weight of dimer of an unsaturated monobasic fatty acid (c).

(g) Cation exchanged bentonite—about 6 to about 14 and preferably about 8 to about 11 parts by weight per 100 parts by weight diepoxide [(a+b)] plus about 9 to about 16 and preferably about 11 to about 15 parts by weight per 100 parts by weigh dimer of an unsaturated monobasic fatty acid (c).

(h) Polymers of butadiene—about 1 to about 100 percent by weight and preferably about 10 to about 50 percent by weight based on the combined weight of the epoxides [(a+b)].

In formulating the compositions of this invention, it is convenient, from a processing standpoint, to prepare a so-called resin portion and a so-called hardener portion and to then blend the two portions together in a paste mixer, such as a Plyes Mixer, at room temperature. A typical resin portion and a typical hardener portion are indicated below.

Resin portion

Diepoxide of a cycloaliphatic ester of a dicarboxylic acid
A 3,4-epoxycyclohexylmethyl 3,4-epoxycyclohexane carboxylate
Cation exchange bentonite
Alkaline earth silicate Hardener portion Polymer of butadiene
Dimer of an unsaturated monobasic fatty acid
Cation exchanged bentonite
Alkaline earth silicate
Anhydride of a polybasic acid
A stannous acylate It is to be understood that there may be added to these compositions, through the resin portion or through the hardener portion, such additives as pigments such as carbon black and the like, processing aids such as propylene carbonate, accelerators such as borontrifluoride or complexes thereof and the like in amounts well known to those skilled in the art.

The compositions of this invention have excellent cure speed, on the order of less than about 10 minutes at 350° F. The curing cycle in each case will depend in part upon the exact formulation of the compositions as well as the temperature to which the compositions are subjected. At room temperature, about 78° F., the compositions of this invention remain stable for a period of time in excess of 24 hours.

The following examples further illustrate the present invention and are not intended to limit the scope thereof in any manner.

EXAMPLE 1

A composition was formulated by blending the ingredients of a "resin portion" and a "hardener portion" in a Pyles Mixer and applied to a thickness of ⅛ of an inch to steel panels which had been electro coated with an epoxy ester prepared by reacting a mixture containing 2,2-bis(p-hydroxyphenyl)propane, diglycidyl ether of 2,2-bis(p-hydroxyphenyl)propane and linseed oil fatty acids as described in U.S. Pat. 3,247,136 to J. Wynstra et al. to obtain a polyether and then esterifying hydroxyl groups with additional linseed oil fatty acids and with trimellitic anhydride.

|  | Compositions (parts by weight) | | | |
|---|---|---|---|---|
|  | Control 1 | A | B | Equivalents |
| Resin portion: | | | | |
| Bis(3,4-epoxy-6-methylcyclohexylmethyl)-adipate-assay=216 gm./gm. mole epoxy | 432 | 432 | 432 | 2.0 |
| 3,4-epoxycyclohexylmethyl 3,4-epoxycyclohexane carboxylate-assay=131 gm./gm. mole epoxy | 528 | 528 | 528 | 3.9 |
| Dimethyloctadecylbenzyl ammonium bentonite | 72 | 72 | 72 | |
| Talc (magnesium silicate) | 960 | 960 | 960 | |
| Propylene carbonate | 23 | 23 | 23 | |
| Carbon black | 1.5 | 1.5 | 1.5 | |
| Hardener portion: | | | | |
| Dimer of linoleic acid | 740 | 740 | 740 | 2.6 |
| Dimethyloctadecylbenzyl ammonium bentonite | 86.4 | 86.4 | 86.4 | |
| Talc (magnesium silicate) | 546 | 546 | 546 | |
| Hexahydrophthalic anhydride | 63 | 63 | 63 | 0.041 |
| Propylene carbonate | 24.8 | 24.8 | 24.8 | |
| Carboxyl terminated copolymer | | 178 | | |
| Carboxyl terminated homopolymer | | | 178 | |

The coated panels were then subjected to the Thermal Shock Test for adhesion.

This test was conducted as follows:

Panels were placed upright in an oven which was at a temperature of 350° F., removed from the oven after twenty minutes and quenched in cold tap water. This was repeated five times for each panel. Visual examination was then made of each panel in order to determine whether there was any loss of adhesion of the solder.

Adhesion for Compositions A and B was excellent. Adhesion for Control 1 was poor.

The carboxyl terminated polymers of this example had the following properties:

|  | Copolymer | Homopolymer |
|---|---|---|
| Terminal carboxyl functionality | 1.74 | 2.01 |
| Molecular weight | 3,270 | 4,790 |
| Combined acrylonitrile percent by weight | 19.4 | 0 |
| Viscosity at 27° C. in centipoises | 120,000 | 35,000 |
| Specific gravity, 25° C./25° C. | 0.948 | 0.907 |

EXAMPLE 2

Compositions A and B and Control 1 of Example 1 were also applied to a thickness of ⅛ of an inch onto steel panels which were then heated for one hour at a temperature of 350° C. The panels were then subjected to the Gardner Impact Test. This test was conducted by striking the cured solder, on the steel panels, with a four-pound round-nose rod. The energy required to fracture the solder is expressed in inch-lbs.

Gardner impact: In. lbs. at room temp.
Control 1 _____ 25
Composition A _____ >100
Composition B _____ >80

It is to be understood that mixtures of materials can be utilized in formulating the compositions of this invention.

Also, the disclosure of all references noted in this application are incorporated herein by reference.

What is claimed is:
1. A curable composition comprising:
(a) about ⅓ to about 3 equivalents of a diepoxide of a cycloaliphatic ester of a dicarboxylic acid having the formula:

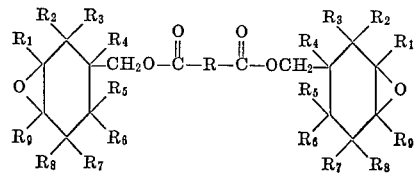

wherein $R_1$ through $R_9$ are hydrogen or alkyl radicals containing 1 to 9 carbon atoms inclusive and R is a divalent hydrocarbon radical containing 3 to 9 carbon atoms inclusive, per equivalent of
(b) a carboxylate having the formula:

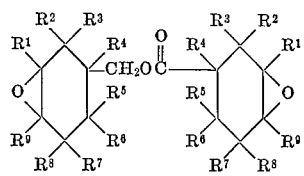

wherein $R^1$ through $R^9$ are as defined for $R_1$,
(c) a dimer of an unsaturated monobasic fatty acid in an amount of about 0.3 to about 0.6 equivalent per total epoxy equivalent of [(a+b)];
(d) an anhydride of a polybasic acid in an amount of about 0.005 to about 0.2 equivalent per 100 parts by weight of (c);
(e) alkaline earth silicate in an amount of about 60 to about 140 parts by weight per 100 parts by weight of (a)+(b) plus about 40 to about 110 parts by weight per 100 parts by weight of (c);
(f) stannous acylate in an amount of about 3 to about 10 parts by weight per 100 parts by weight of (c);
(g) onium cation exchanged bentonite in an amount of about 6 to about 14 parts by weight per 100 parts by weight of (a)+(b) plus about 9 to about 16 parts by weight per 100 parts by weight of (c);
(h) a polymer of butadiene which is a carboxyl containing poly(butadiene) or a copolymer of butadiene and acrylonitrile containing about 1 to about 99 percent by weight combined acrylonitrile, said polymer having an average of more than one terminal carboxyl group per molecule, having a molecular weight of about 500 to about 15,000 and being present in said composition in an amount of about 1 to about 100 percent by weight based on the combined weight of (a)+(b).

2. A composition as defined in claim 1 wherein the copolymer of butadiene and acrylonitrile contains about 5 to about 50 percent by weight combined acrylonitrile.

3. A curable composition as defined in claim 1 comprising: about ½ to about 2 equivalents of (a) per equivalent of (b); an amount of (c) of about 0.4 to about 0.5 equivalent per total epoxy equivalent (a)+(b); an amount of (d) of about 0.02 equivalent to about 0.09 equivalent per 100 parts by weight (c); an amount of (e) of about 80 to about 120 parts by weight per 100 parts by weight of (a)+(b) plus about 58 to about 90 parts by weight per 100 parts by weight of (c); an amount of (f) of about 4 to about 8 parts by weight per 100 parts by weight of (c); an amount of (g) of about 8 to about 11 parts by weight per 100 parts by weight (a)+(b) and plus about 11 parts to about 15 parts by weight per 100 parts by weight (c) and an amount of (h) of about 10 to about 50 percent by weight based on the combined weight of (a)+(b).

4. The cured product of the composition defined in claim 1.

5. A composition as defined in claim 1 wherein (a) is bis(3,4-epoxy-6-methylcyclohexylmethyl)adipate.

6. A composition as defined in claim 1 wherein (b) is 3,4 - epoxycyclohexylmethyl 3,4 - epoxycyclohexane carboxylate.

7. A composition as defined in claim 1 wherein (c) is the dimer of linoleic acid.

8. A composition as defined in claim 1 wherein (d) is hexahydrophthalic anhydride.

9. A composition as defined in claim 1 wherein (d) is a mixture of hexahydrophthalic anhydride and benzophenonetetracarboxylic acid dianhydride.

10. A composition as defined in claim 1 wherein (e) is stannous octoate.

11. A composition as defined in claim 1 wherein (f) is dimethyldioctadecylammonium bentonite.

12. A composition as defined in claim 1 wherein the bentonite is a quaternary ammonium cation exchanged bentonite.

13. A composition as defined in claim 1 wherein (f) is dimethyloctadecylbenzylammonium bentonite.

14. A composition as defined in claim 1 wherein (f) has a moisture content of about 0.5 to about 3 percent by weight.

15. A composition as defined in claim 1 wherein (h) is poly(butadiene).

16. A composition as defined in claim 1 wherein (h) is a copolymer of acrylonitrile and butadiene.

17. A composition as defined in claim 1 wherein the polymer of butadiene has a molecular weight of about 1,000 to about 15,000.

References Cited
UNITED STATES PATENTS

| | | | |
|---|---|---|---|
| 2,947,338 | 8/1960 | Reid et al. | 260—23 |
| 3,305,601 | 2/1967 | Hicks | 260—23 |
| 3,334,057 | 8/1967 | Marks et al. | 260—23 |
| 3,449,274 | 6/1969 | Salensky | 260—37 |

DONALD E. CZAJA, Primary Examiner

E. C. RZUCIDLO, Assistant Examiner

U.S. Cl. X.R.

117—132 BE; 260—18 EP, 37 EP, 78.4 EP, 830 R

PO-1050
(5/69)

UNITED STATES PATENT OFFICE
CERTIFICATE OF CORRECTION

Patent No. 3,635,860          Dated January 18, 1972

Inventor(s) George A. Salensky

It is certified that error appears in the above-identified patent and that said Letters Patent are hereby corrected as shown below:

Column 2, line 60; $(C_\beta H_{2\beta})-COOH$ should read $(C_\beta H_{2\beta -3})-COOH$ Column 3, line 72; "epoxy)" should read --epoxy--

Column 4, line 24; "weigh" should read --weight--;
               line 34, "Plyes" should read --Pyles--

Signed and sealed this 11th day of July 1972.

(SEAL)
Attest:

EDWARD M. FLETCHER, JR.                   ROBERT GOTTSCHALK
Attesting Officer                              Commissioner of Patents